Feb. 28, 1950   E. MANNING   2,498,995
APPARATUS FOR TESTING ENGINES
Filed March 14, 1945   2 Sheets-Sheet 1
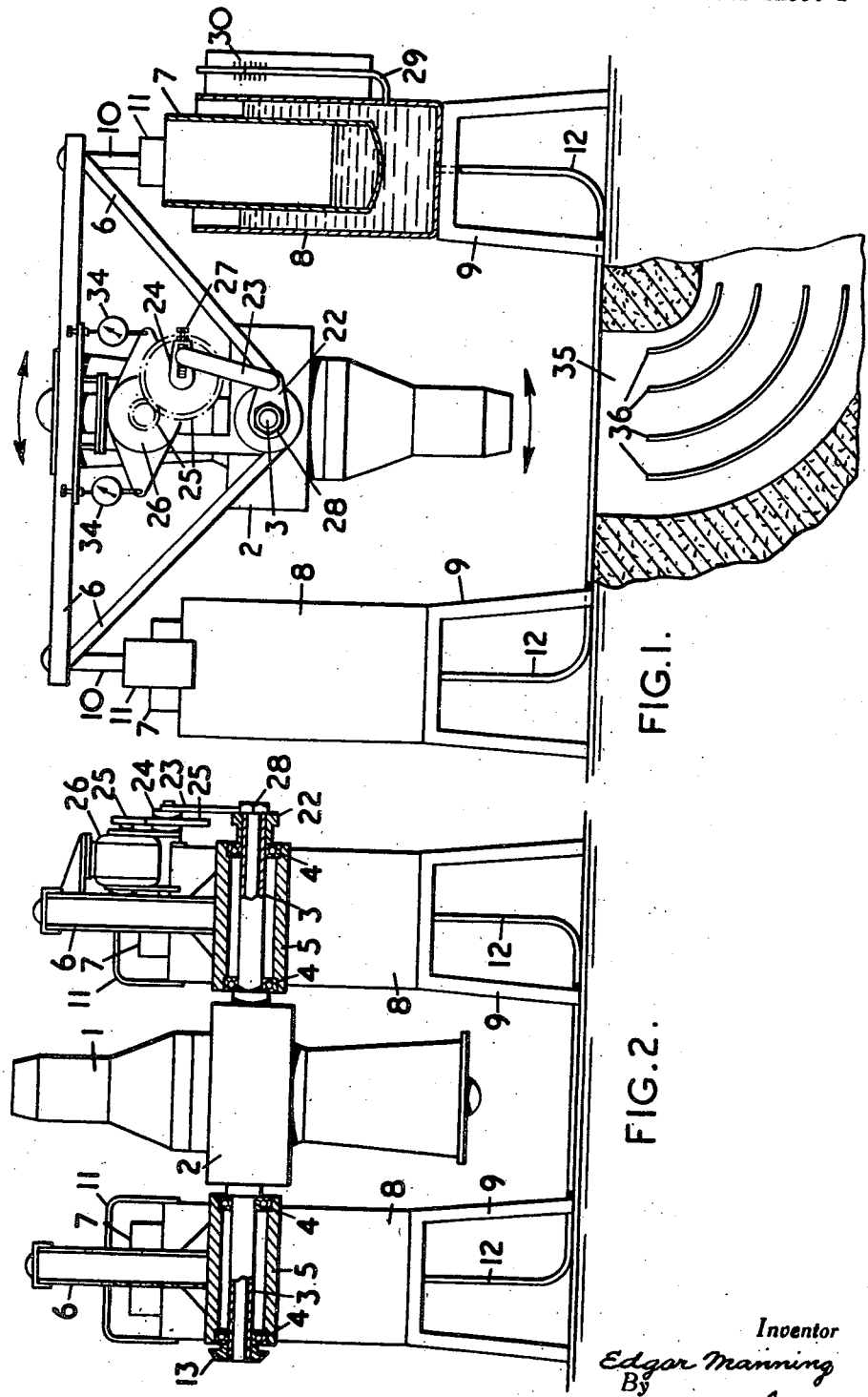
Inventor
Edgar Manning
By
Loyd Hall Sutton
Attorney Feb. 28, 1950     E. MANNING     2,498,995
APPARATUS FOR TESTING ENGINES
Filed March 14, 1945     2 Sheets-Sheet 2
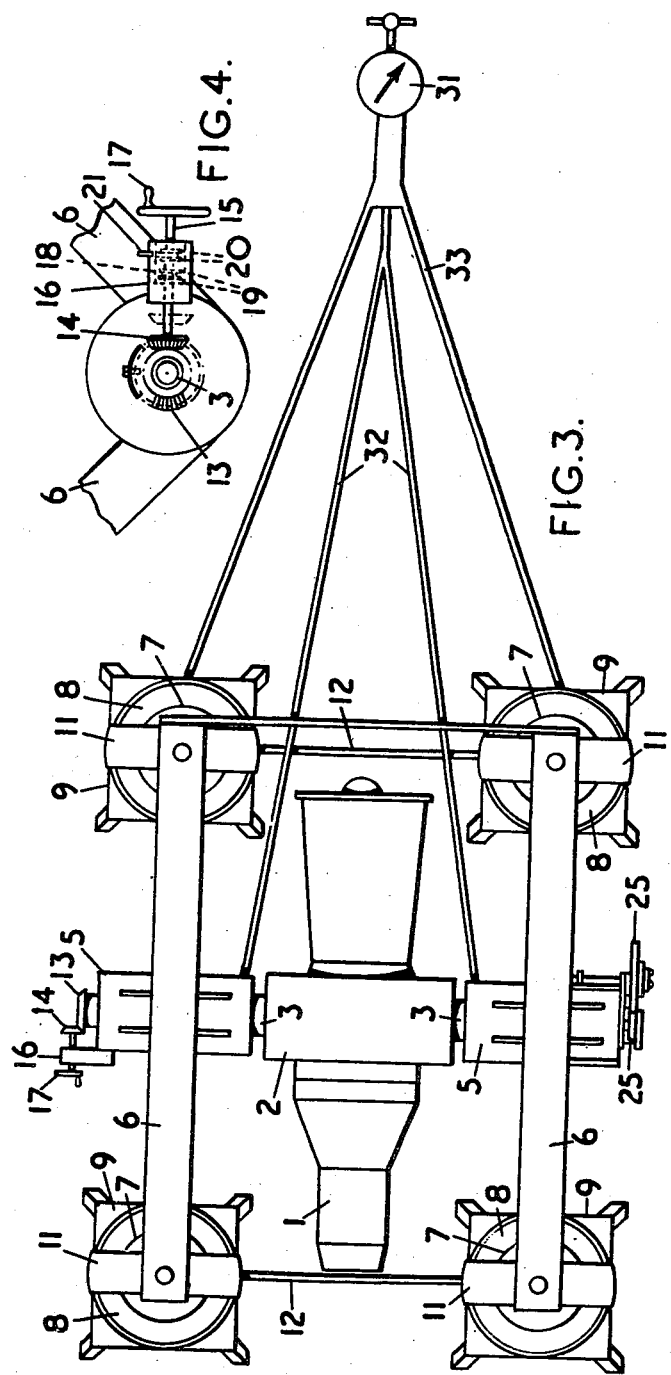
Inventor
Edgar Manning
By
Loyd Hall Sutton
Attorney Patented Feb. 28, 1950

2,498,995

UNITED STATES PATENT OFFICE 2,498,995

APPARATUS FOR TESTING ENGINES

Edgar Manning, Farham, England, assignor to Power Jets (Research and Development) Limited, London, England, a British company Application March 14, 1945, Serial No. 582,775
In Great Britain March 16, 1944

11 Claims. (Cl. 73—116)

This invention relates to apparatus for testing engines, more particularly engines for aircraft, and has for its object to provide a new or improved testing apparatus in which an engine can be mounted and tested under conditions simulating or comparable with those which obtain in actual flight. A further object is to provide an engine testing apparatus with which it is possible to reproduce the same conditions for different tests so that direct comparisons can be made between different engines of the same type or engines of different types.

According to the invention, the testing apparatus comprises a structure or structures which is or are freely supported by flotation and provided with means for rotationally mounting the engine about a traverse or diametrical axis, means for turning the engine mounting means into different positions about said axis, and means for oscillating the engine mounting means about said axis. One of the important features of such testing apparatus is that it enables the mounting of an aircraft propulsion unit for rotation about an axis transverse to the direction of its propulsive thrust and with a degree of freedom permitting the unit to be readily adjusted to any desired datum position while under test. The apparatus is also so constructed as to permit bodily movement of the unit under test in response to its propulsive thrust in two directions in its plane of rotational adjustment, and includes means for measuring any such bodily movement in either of said two directions.

The invention will now be more particularly described with reference to the embodiment illustrated in the accompanying drawings, in which:

Fig. 1 is a side elevation, partly in section, of the testing apparatus with an aircraft engine mounted in a vertical position therein with its exhaust directed downwards.

Fig. 2 is an end elevation, partly in section, of the testing apparatus with an aircraft engine mounted in a vertical position therein but with its exhaust upwardly directed.

Fig. 3 is a plan view of the testing apparatus with an aircraft engine mounted therein in a horizontal position.

Fig. 4 is a fragmentary view illustrating in side elevation the turning gear for rotational adjustment of the engine mounting means about a transverse or diametrical axis.

Referring to the drawings, the engine 1 to be tested is secured in a mounting ring or cradle 2 having diametrically opposed hollow trunnions 3 whereby the ring or cradle 2 is supported for rotation in anti-friction bearings 4 which are mounted in cylindrical bearing housing 5 carried one by each of a pair of triangular side frames 6, said bearing housings 5 being underslung centrally at the apices of said side frames 6.

Each side frame 6 is supported by floats or pontoons 7 connected one to each end of the side frame 6 and immersed in water, oil, or other suitable liquid in appropriate tanks 8 supported on stands 9. The four floats or pontoons 7 are in the form of hollow vertically disposed cylinders, and they are connected to the ends of the side frames by guide rods 10 passed through guide holes in brackets 11 which are secured to and bridge the upper parts of the flotation tanks 8, the said holes being large enough to permit free vertical movement of the guide rods 10 and a limited amount of lateral displacement thereof, the amount of lateral displacement permitted being such as to avoid the floats or pontoons 7 engaging the sides of the tanks 8. The four tanks 8 are interconnected at their bases by pipes 12 so that a common liquid level and the same pressure will prevail at any moment, and the hollow form of the floats or pontoons 7 enables them to be adjustably loaded, with liquid or other appropriate ballast as desired, so that with the engine stationary and mounted in the ring or cradle 2 in the required angular position for test, the level of the liquid in the tanks 8 can be adjusted, by the addition or removal of ballast as necessary, to coincide with or lie in the same horizontal plane as the transverse axis about which the ring or cradle 2 is rotationally mounted.

In order to enable the engine mounting ring or cradle 2 to be turned about the trunnion axis into any desired angular position, one of the trunnions 3 has secured thereon a bevel spur wheel 13 with which a bevel spur pinion 14 on a driving shaft 15 can be meshed. The shaft 15 is rotatable and slidable in bearing block 16 fixed to the adjacent side frame 6 and is fitted at its outer end with a handwheel 17, whilst the block 16 is recessed at 18 to accommodate double flanges or collars 19, 20 on said shaft 15 and has a lateral guide slot for bifurcated locking plate 21 adapted to a straddle the shaft 15; the arrangement is such that with the plate 21 engaged between the flanges or collars 20, as shown in Fig. 4, the bevel pinion 14 is maintained in mesh with the bevel wheel 13, whilst when it is desired to retain the bevel pinion 14 in the inoperative or out-of-mesh position, indicated by chain lines in Fig. 4, the plate 21 is withdrawn from engagement with the flanges or collars 20, the handwheel shaft 15 is moved axially to bring the neck between the flanges or collars 19 into line with the guide slot in the bearing block 16, and the locking plate 21 is reinserted to straddle the shaft 15 between the flanges or collars 19.

For oscillating the engine mounting ring or cradle 2 about the transverse axis, the other trunnion 3 is connected through a crank 22, link 23, adjustable throw crank disc 24, and spur reduction gearing 25 to the shaft of an electric motor 26 mounted on the adjacent side frame 6. The throw adustment of the crank and link mechanism 22, 23, 24, so that the amplitude of the oscillations imparted to the engine mounting ring or cradle 2 can be varied, is effected by the screw 27 which alters the position of the upper end of the link 23 in relation to the centre of the crank disc 24, whilst the crank 22 is releasably connected to the trunnion 3 by a nut 28 so that said crank and link mechanism can be disconnected whilst the engine mounting ring or cradle is being adjusted by the hand operated turning gear 13, 14.

The hollow trunnions 3 permit fuel and oil supply pipes and electrical leads (not shown) for the engine to be led through them.

With the test apparatus above described the engine 1 mounted in the ring or cradle 2 can be run in a horizontal, vertical or intermediate angular position whilst the ring or cradle 2 is kept stationary with respect to the side frame 6, or it may be oscillated about any such position through the medium of the motor driven oscillating mechanism 22, 23, 24 and 25, and by means of appropriate measuring, indicating and/or recording instruments the performance or characteristics of the engine under conditions simulating or comparable with those which obtain in flight can be readily ascertained. For example, with the engine running in a vertical position (Fig. 1 or 2), thrust can be measured by the displacement of liquid in the tanks 8 and this may be indicated by a manometer tube 29 connected to one of the tanks 8 and having an appropriately graduated scale 30 associated therewith (see Fig. 1), whilst with the engine running in a horizontal position (Fig. 3) the thrust can be measured by means of a spring balance or statometer 31 connected to the side frames 6 or housings 5 by compression members 32 and to the tank stands 9 by tension members 33. Again, for measuring gyroscopic couples this can be effected by appropriate dynamometer mechanism 31, mounted on one of the side frames 6 (see Fig. 1), whilst the engine 1 in its cradle 2 is being rocked to and fro with respect to any angular position through the medium of the oscillating gear.

When the engine is tested in a vertical position with the exhaust directed downwards the exhaust gases may be carried away by a conduit 35 fitted with a cascade of deflector vanes 36 as illustrated in Fig. 1.

In the drawings the engine illustrated is of the internal combustion turbine type for the propulsion of aircraft by jet thrust alone. Where a conventional aircraft engine for driving an airscrew is to be tested, the airscrew would, of course, be fitted to the engine propeller shaft for the tests.

What I claim as my invention and desire to secure by Letters Patent is:

1. Apparatus for testing engines, comprising in combination engine supporting structural means, means for freely supporting said structural means by flotation, means for rotationally mounting the engine about a transverse axis in said structural means, means for turning the engine mounting means into different positions about the said axis, and means for oscillating the engine mounting means about said axis.

2. Apparatus for testing engines, comprising in combination side frames, floats freely supporting said side frames by flotation upon an appropriate liquid, a cradle having diametrically opposed trunnions whereby the engine is rotationally mounted about a transverse axis between said side frames, means for turning the engine mounting cradle into different positions about said axis, and means for oscillating the engine mounting cradle about said axis.

3. Apparatus for testing engines, comprising in combination side frames, floats freely supporting said side frames by flotation upon an appropriate liquid, vessels containing said liquid and each accommodating one of said floats, said vessels being interconnected so that a common liquid level prevails in said vessels, trunnion bearings carried by said side frames, an engine mounting cradle, diametrically opposed trunnions on said cradle and engaging the trunnion bearings on the side frames, means for turning the engine mounting cradle into different positions about said axis, and means for oscillating the engine mounting cradle about said axis.

4. Apparatus for testing engines, comprising in combination side frames, floats freely supporting said side frames by flotation upon an appropriate liquid, vessels containing said liquid and each freely accommodating one of said floats, said vessels being interconnected so that a common liquid level prevails in said vessels, trunnion bearings carried by said side frames, an engine mounting cradle, diametrically opposed trunions on said cradle and engaging the trunnion bearings on the side frames, gearing associated with one of said trunnions for turning the engine mounting cradle about the trunnion axis into different positios of rotational adjustment about said axis, a motor, and crank and link mechanism connecting the other trunnion to said motor for oscillating the engine mounting cradle about said axis.

5. Apparatus for testing engines, comprising side frames, floats freely supporting said side frames by flotation upon an appropriate liquid, vessels containing said liquid and each freely accommodating one of said floats to permit vertical and lateral movement thereof, said vessels being interconnected so that a common liquid level prevails in said vessels, trunnion bearings carried by said side frames, an engine mounting cradle, diametrically opposed trunnions on said cradle and engaging the trunnion bearings on the side frames, gearing associated with one of said trunnions for turning the engine mounting cradle into any desired position of rotational adjustment about said axis, a motor, crank and link mechanism connecting the other trunnion to said motor for oscillating the engine mounting cradle about said axis, means for connecting and disconnecting the turning gear of the engine mounting cradle, and means for connecting and disconnecting the drive for oscillating the engine mounting cradle about said axis.

6. Apparatus for testing engines, comprising side frames, floats connected to opposite ends of the side frames, vessels each freely accommodating one of said floats and containing liquid upon which the side frames and floats are supported by flotation so as to allow of vertical and limited lateral movement, pipes connecting the vessels so that a common liquid level prevails therein, underslung bearing housings provided one on each side frame and between the end floats, anti-friction bearings mounted in said housings, an annular cradle for mounting the engine, diametrically opposed trunnions on said cradle and engaging said anti-friction bearings for rotation therein, gearing associated with one of said trunnions for turning the engine mounting cradle into any desired position of rotational adjustment about said axis, means for connecting and disconnecting the said gearing so that it can be rendered ineffective at will, variable crank and link mechanism associated with the other trunnion, a motor on the side frame which carries the bearing housing and bearing for said other trunion, gearing driven by said motor and connected to said crank and link mechanism so that, when operative, oscillating motion is imparted to the engine mounting cradle, and means for connecting and disconnecting at will the drive for oscillating the engine mounting cradle in its bearings.

7. In apparatus for testing aircraft propulsion units adapted to generate propulsive thusst, means for mounting the propulsive unit for rotation about an axis transverse to the direction of its propulsive thrust and with a degree of freedom enabling said unit to be adjusted to different datum positions under test, and means supporting said unit mounting means for movement in two directions in the plane of rotational adjustment of said unit.

8. In apparatus for testing aircraft propulsion units adapted to generate propulsive thrust, the combination of means for mounting the propulsive unit for rotation about an axis transverse to the direction of its propulsive thrust and with a degree of freedom enabling said unit to be adjusted to different datum positions when under test, means supporting said unit mounting means for movement in two directions in the plane of rotational adjustment of said unit, and means for oscillating the unit about said axis with respect to any selected datum position.

9. In apparatus for testing aircraft propulsion units adapted to generate propulsive thrust, the combination of means for mounting the propulsive unit for rotation about an axis transverse to the direction of its propulsive thrust and with a degree of freedom enabling said unit to be adjusted to different datum positions when under test, means permitting bodily movement of said unit in response to its propulsive thrust in two directions in its plane of rotational adjustment, and means for measuring any such bodily movement in each of said two directions.

10. In apparatus for testing aircraft propulsion units adapted to generate propulsive thrust, means for mounting the propulsive unit for rotation about an axis transverse to the direction of its propulsive thrust and with a degree of freedom enabling said unit to be adjusted to different datum positions when under test, means for supporting said mounting means by flotation, and an indicator actuated by said flotation supporting means responsive to and providing a measure of variations in any vertical component of the propulsive thrust of a unit under test.

11. In apparatus for testing aircraft propulsion units adapted to generate propulsive thrust, means for mounting the propulsive unit for rotation about an axis transverse to the direction of its propulsive thrust and with a degree of freedom enabling said unit to be adjusted to different datum positions when under test, means for supporting said mounting means by flotation, an indicator actuated by said flotation supporting means responsive to and providing a measure of variations in any vertical component of the propulsive thrust of a unit under test, and means for adjusting the level of flotation to compensate for the dead weight of a unit under test.

EDGAR MANNING.

REFERENCES CITED

The following references are of record in the file of this patent:

UNITED STATES PATENTS

| Number | Name | Date |
|---|---|---|
| 1,560,435 | Sperry | Nov. 3, 1925 |
| 2,019,755 | Zerbe et al. | Nov. 5, 1935 |
| 2,095,142 | Lurenbaum | Oct. 5, 1937 |
| 2,362,308 | Roberts | Nov. 7, 1944 |
| 2,387,148 | Hem | Oct. 16, 1945 |

FOREIGN PATENTS

| Number | Country | Date |
|---|---|---|
| 116,045 | Great Britain | May 30, 1918 |
| 124,773 | Great Britain | Apr. 10, 1919 |
| 259,924 | Germany | May 15, 1913 |